United States Patent Office 3,474,115
Patented Oct. 21, 1969

3,474,115
WATER SOLUBLE ALDOSTERONE LIKE AGENTS
George C. Buzby, Jr., Philadelphia, and Herchel Smith, Wayne, Pa., assignors to American Home Products Corporation, New York, N.Y., a corporation of Delaware
No Drawing. Filed June 22, 1967, Ser. No. 647,927
Int. Cl. C07c 169/12; A61k 27/00
U.S. Cl. 260—397.1                          7 Claims

ABSTRACT OF THE DISCLOSURE

This invention is concerned with water soluble salts of 13-alkyl-17-hydroxy - 3-oxo-5γ-gonane-17α-propionic acids which are pharmacologically active as mineralocorticoids.

The present invention relates to new and novel water soluble aldosterone like compounds. In particular, the present invention is concerned with the water soluble salts of 13-alkyl-17-hydroxy-3-oxo-5γ-gonane-17α - propionic acids which are therapeutically efficacious as mineralocorticoids.

The compounds which are within the scope of the present invention are:

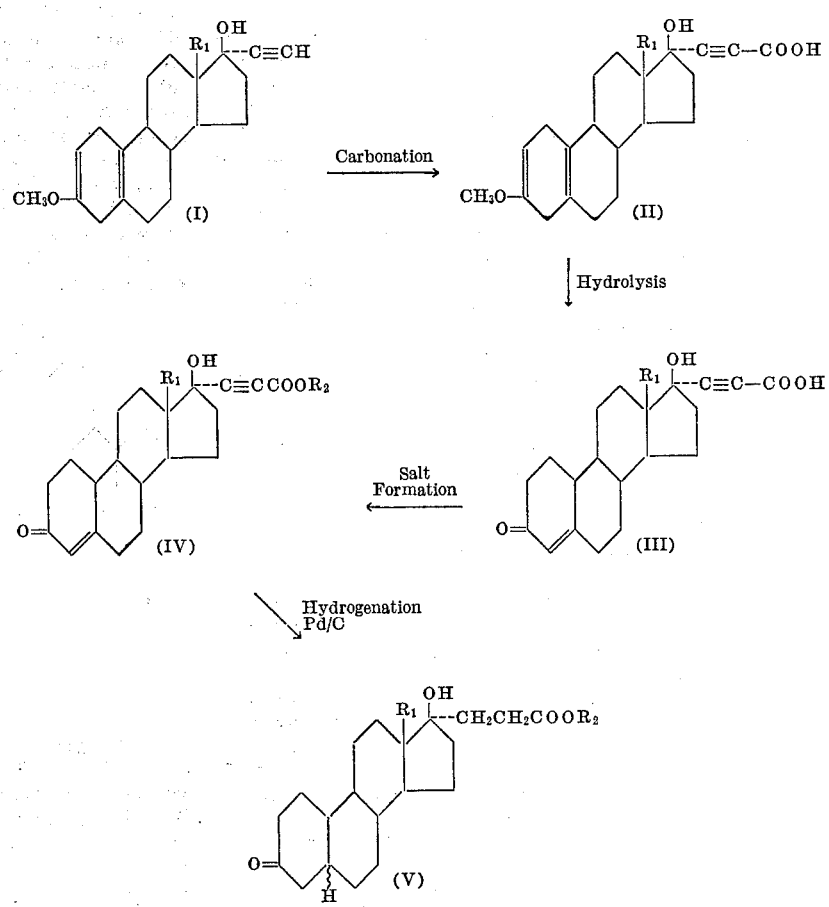

wherein $R_1$ is selected from the group consisting of lower alkyl; $R_2$ represents the sodium or potassium salt; and the symbol ($\updownarrow$) designates the α or β configuration. Typical examples are: 13-ethyl-17-hydroxy-3-oxo-5γ-gonane-17α-propionic acid, sodium salt; 13-butyl 17-hydroxy-3-oxo-5γ-gonane-17α-propionic acid, potassium salt; and 17 - hydroxy - 3-oxo-13-propyl-5γ-gonane-17α-propionic acid, sodium salt.

The compounds of the present invention may be prepared as illustrated by the following reaction scheme;

wherein $R_1$, $R_2$ and (?) are defined as above. The carbonation reaction is effected by treating an appropriate 13-alkyl-17α-ethynyl-3-methoxygona - 2,5(10) - dien - 17β-ol (I) with an excess of a Grignard reagent in a reaction-inert organic solvent e.g. ether, tetrahydrofuran, dioxane and diethylene glycol dimethyl ether or mixtures thereof at about reflux temperatures for a period of about two to about four hours. Thereafter, the reaction mixture is intimately contacted with dry carbon dioxide for a period of about four to about eight hours. Preferably this reaction is conducted by admixing a 13-alkyl-17α-ethynyl-3-methoxygona-2,5(10)-dien-17β-ol (I) in tetrahydrofuran with commercially available 3 M methyl magnesium bromide in ether and refluxing the resulting mixture for about two hours. Subsequently, dry carbon dioxide is passed over the stirred reaction for about four hours.

When the carbonation reaction is complete, the reaction mixture is poured into an aqueous solution of a mild hydrolizing acid e.g. tartaric or citric acid, then extracted with a water-immiscible organic solvent, such as benzene, toluene, xylene and ether, dried and evaporated to dryness to afford a 13-alkyl-17-hydroxy-3-methoxygona-2,5(10)-dien-17α-propiolic acid (II) which may be further purified by procedures well known in the art or utilized as such in the following reaction.

The hydrolysis reaction is effected by treating the above prepared 13-alkyl-17-hydroxy - 3 - methoxygona-2,5(10)-dien-17α-propiolic acid (II) in a water-miscible organic solvent e.g. an alkanol, dioxane or diethylene glycol dimethyl ether with a mineral acid. Preferably this reaction is conducted by dissolving the 13-alkyl-17-hydroxy-3-methoxygona-2,5(10)-dien-17α-propiolic acid (II) in methanol and treating the resulting solution with concentrated hydrochloric acid and water. When the above hydrolysis is complete, the reaction mixture is poured into water, then extracted with a water-immiscible organic solvent, such as benzene, xylene, toluene and ether, dried and evaporated to dryness. The residue is dissolved in an aqueous alkali metal hydroxide or carbonate, clarified with decolorizing charcoal, filtered, acidified and filtered. The collected solid is a 13-alkyl-17-hydroxy-3-oxogon-4-en-17α-propiolic acid (III) which may then be further purified by recrystallization from a suitable solvent e.g. ethyl acetate.

The corresponding alkali metal salts of the above prepared 13-alkyl-17-hydroxy - 3 - oxogon-4-en-17α-propiolic acid (III) are readily prepared by admixing an alkanolic solution of said acid (III) with an alkali metal bicarbonate e.g. sodium bicarbonate and potassium bicarbonate and water. When the salt formation is complete, the resulting product is separated by conventional procedures, such as, evaporation, reconstitution e.g. in absolute methanol and subsequent displacement of the methanol by boiling with acetone, chilling and filtering to afford a 13-alkyl-17-hydroxy-3-oxogon-4-en-17α-propiolic acid, alkali metal salt (IV).

The hydrogenation of the above 13-alkyl-17-hydroxy-3-oxogon-4-en-17α-propiolic acid, alkali metal salt (IV) is effected by contacting said salt with about two percent to about ten percent palladium on charcoal catalyst, in the presence of hydrogen, in an alkanol-dioxane solvent mixture until about three moles of hydrogen have been taken-up. Preferably this reaction is effected by contacting a solution of a 13-alkyl-17-hydroxy-3-oxogon-4-en-17α-propiolic acid, alkali metal salt (IV) in methanol-dioxane (about 1:4 ratio) with a suspension of five percent palladium on charcoal in the same solvent mixture until hydrogen up-take (three moles) is complete. When the above hydrogenation is complete, the reaction mixture is filtered, the filtrate evaporated, the residue dissolved in an appropriate solvent e.g. ethanol, re-concentrated and the residue is triturated with a suitable solvent, such as ether, to afford a 13-alkyl-17-hydroxy-3-oxo-5γ-gonane-17α-propionic acid, alkali metal salt (V).

It has also been found that the 13-alkyl-17-hydroxy-3-oxogon-4-en-17α-propiolic acid, alkali metal salt (IV) prepared above may also be hydrogenated with a palladium oxide on strontium carbonate catalyst to produce a 13 - alkyl-17-hydroxy-3-oxogon-4-ene-17α-propionic acid, alkali metal salt (VI), as illustrated in the following reaction sequence:

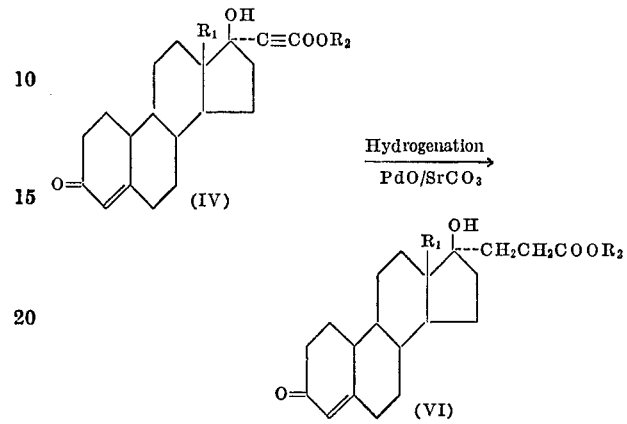

wherein $R_1$ and $R_2$ are defined as above. The above hydrogenation is effected by admixing a 13-alkyl-17-hydroxy-3-oxogon-4-en-17α-propiolic acid, alkali metal salt (IV) with about two to about ten percent palladium oxide on strontium carbonate, in the presence of hydrogen, in an alkanol-dioxane solvent mixture until about two moles of hydrogen are taken-up. Preferably this reaction is effected by contacting a 13-alkyl-17-hydroxy-3-oxogon-4-en-17α-propiolic acid, alkali metal salt (IV) in methanol-dioxane (about 1:4 ratio) with a suspension of two percent palladium on strontium carbonate in the same solvent mixture until hydrogen up-take (two moles) is complete.

When the hydrogenation reaction is complete, the resulting 13-ethyl-17-hydroxy-3-oxogon-4-ene-17α-propionic acid, alkali metal salt (VI) is recovered by standard methods, for example, filtration, concentration, reconstitution with a suitable solvent e.g. isopropanol, filtration, re-concentration, dilution with acetone and filtration to afford the purified desired compound (VI).

Further, it has been found that the 13-alkyl-17-hydroxy-3-oxogon-4-en-17α-propiolic acid, alkali metal salt (IV) may be hydrogenated with a palladium oxide on calcium carbonate catalyst to produce a 13-alkyl-17-hydroxy-3-oxogon-4-ene-17α-acrylic acid, alkali metal salt (VII), as depicted by the following reaction:

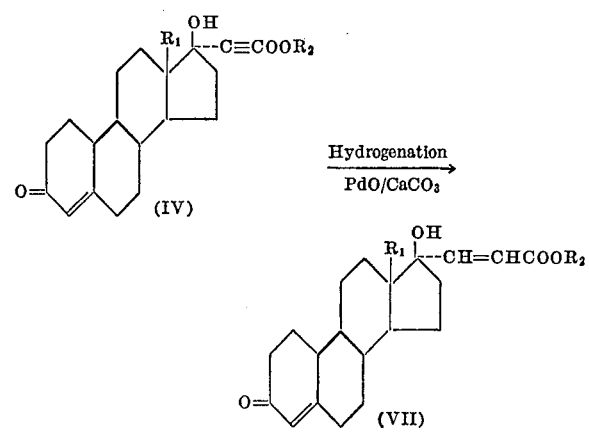

wherein $R_1$ and $R_2$ are defined as above. The aforesaid hydrogenation is conducted by mixing an appropriate 13-alkyl-17-hydroxy-3-oxogon-4-en-17α-propiolic acid, alkali metal salt (IV) with about two to about ten percent palladium oxide on calcium carbonate, in the presence of hydrogen, in pyridine until one mole of hydrogen has been absorbed. Preferably this reaction is conducted by contacting a 13-alkyl-17-hydroxy--3-oxogon-4-en-17α-propiolic acid, salt (IV) in pyridine with a suspension of two percent palladium oxide on calcium carbonate in pyridine until hydrogen up-take (one mole) is complete.

When the hydrogenation reaction is complete, the product (VII) is obtained by conventional recovery procedures, for example, filtration, concentration, trituration with an appropriate solvent e.g. ether, and filtration to obtain a 13-ethyl-17-hydroxy-3-oxogon-4-ene-17α-acrylic acid, salt (VII).

Many of the reactants employed in the process of this invention are known compounds which are readily available from commercial sources, others may be prepared in accordance with standard organic procedures well known to those skilled in the art. In this regard the 13-alkyl - 17α - ethynyl - 3 - methoxygona - 2,5(10) - dien-17β-ol (I) starting compounds may be prepared by the process described in copending United States patent application, Ser. No. 540,924, filed on Apr. 7, 1966 and entitled "Synthesis of Gona-2,5(10)-dienes."

In accord with the present invention, the new and novel steroid compounds of this invention have been found to possess interesting pharmaceutical properties which render them useful as synthetic medicinals. More particularly, these compounds, in standard pharmacological tests, have exhibited utility as mineralocorticoids and, therefore, find use in Addison's disease.

When the compounds of this invention are employed as mineralocorticoids, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules. They may be administered orally in the form of solutions which may contain coloring and flavoring agents or they may be injected parenterally, that is, intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 5 to about 50 mg./kilo/day, although as aforementioned variations will occur.

The following examples are given by way of illustration and are not to be construed as limitations of this invention, many variations of which are possible without departing from the scope and spirit thereof.

EXAMPLE I

13 - ethyl - 17α - ethynyl - 3 - methoxygona - 2,5(10)-dien-17β-ol (3.0 g.) in dry tetrahydrofuran (60 ml.) is treated with methyl magnesium bromide (3 M) and the mixture is refluxed for two hours. Thereafter, dry carbon dioxide is passed over the surface of the stirred reaction for four hours, then the reaction mixture is poured into aqueous tartaric acid and extracted with benzene, washed dry and evaporated to afford crude 13-ethyl-17-hydroxy-3-methoxygona-2,5(10)-dien-17α-propiolic acid.

The crude 13-ethyl-17-hydroxy-3-methoxygona-2,5(10)- dien-17α-propiolic acid prepared above in methanol (90 ml.) is treated with concentrated hydrochloric acid (6.0 ml.) and water (4.0 ml.). The mixture is then poured into water, extracted with benzene, washed dry and evaporated. The crystalline residue is dissolved in alkali and the resulting solution is clarified with decolorizing carbon, filtered and the filtrate acidified. The precipitated solid is recrystallized from ethyl acetate to afford 13-ethyl-17-hydroxy-3-oxogon-4-en-17α-propiolic acid (1.45 g.) M.P. 203–205° C. (d.);

$\lambda_{max.}^{KBr}$ 3.1, 4.5, 5.82, 6.06μ;

$\lambda_{max.}^{EtOH}$ 240 mμ (ε 14,000).

EXAMPLE II

To 13-ethyl-17-hydroxy-3-oxogon-4-en - 17α - propiolic acid (1.3035 g.) in 95 percent ethanol (20 ml.) there is added sodium bicarbonate (0.306 g.) and water (3 ml.). Thereafter, the solvents are removed under vacuum, the residue is dissolved in absolute methanol, filtered and the methanol displaced by boiling with acetone. Upon chilling and filtering there is obtained 13-ethyl-17-hydroxy-3-oxogon-4-en-17α-propiolic acid, sodium salt, sesquihydrate, (1.10 g.), M.P. 174–176° C. (d.), $\lambda_{max.}^{KBr}$ 3.0, 4.55, 6.0, 6.30. $C_{22}H_{27}O_4Na \cdot 1.5H_2O$ requires: C, 65.11; H, 7.45; Na, 5.7. Found: C, 65.38; H, 7.55; Na, 6.1.

Alternatively, the corresponding potassium salt of 13-ethyl-17-hydroxy-3-oxogon-4-en-17α-propiolic acid is prepared when potassium bicarbonate is employed.

EXAMPLE III 13-ethyl-17-hydroxy-3-oxogon-4-en-17α-propiolic acid, sodium salt (0.250 g.) in 20 percent methanol-80 percent dioxane (10 ml.) is added to a pre-reduced suspension of 5 percent palladium on charcoal (0.10 g.) in 50 ml. of the same solvent mixture. The mixture is shaken until up-take of three moles of hydrogen has been achieved. Thereafter, the reaction mixture is filtered and the filtrate evaporated under vacuum. The residue is dissolved in absolute ethanol, filtered and evaporated. The solid residue is triturated with ether to afford 13-ethyl-17-hydroxy-3-oxo-5γ-gonane-17α-propionic acid, sodium salt, dihydrate, (0.125 g.) M.P. 160–170° C. (d.);

$\lambda_{max.}^{KBr}$ 3.10, 5.85, 6.42μ. $C_{22}H_{33}O_4Na \cdot 2H_2O$ requires: C, 62.20; H, 8.76. Found, C, 62.01; H, 8.08.

Similarly, the 13-ethyl-17-hydroxy-3-oxo - 5γ - gonane-17α-propionic acid, potassium salt, dihydrate is produced.

EXAMPLE IV 13-ethyl-17-hydroxy-3-oxogon-4-en-17α-propiolic acid, sodium salt (0.200 g.) is dissolved in pyridine (15 ml.) and added to a pre-reduced suspension of 2 percent palladium oxide on calcium carbonate in pyridine (10 ml.). Hydrogenate until one mole of hydrogen has been absorbed, filter and evaporate under vacuum. The residue is then triturated with ether and filtered to yield 13-ethyl-17-hydroxy-3-oxogon-4-ene-17α-acrylic acid, sodium salt, (0.180 g.), M.P. 175–185° C. (d.);

$\lambda_{max.}^{KBr}$ 3.04, 6.0, 6.45μ. $C_{22}H_{29}O_4Na \cdot 1.5H_2O$ requires: C, 64.48; H, 7.19. Found: C, 64.46; H, 7.54.

EXAMPLE V 13-ethyl-17-hydroxy-3-oxogon-4-en-17α-propiolic acid, sodium salt (0.571 g.) is dissolved in 20 percent methanol-80 percent dioxane (20 ml.) and added to a pre-reduced suspension of 2 percent palladium oxide on strontium carbonate (0.20 g.) in the same solvent mixture (50 ml.). The mixture is treated with hydrogen until up-take of two moles has been achieved, then filter and remove the solvents under vacuum. The residue is dissolved in isopropanol, filtered and concentrated to a small volume. Acetone is added with chilling and filtration affords 13-ethyl-17-hydroxy-3-oxogon-4-ene-17α-propionic acid, sodium salt, (0.390 g.) M.P. 178–183° C. (d.), $\lambda_{max.}^{KBr}$ 3.04, 5.99, 6.44μ;

$\lambda_{max.}^{EtOH}$

240mμ (ε 10,300). $C_{22}H_{31}O_4Na \cdot 2.5H_2O$ requires: C, 61.80; H, 8.48. Found: C, 61.70; H, 8.09.

EXAMPLE VI

Repeating the procedure of Example I the following 13-alkyl-17α-ethynyl-3-methoxygona-2,5(10) - dien-17β-ols are reacted with methyl magnesium bromide to produce their corresponding 13-alkyl-17-hydroxy-3-methoxygona-2,5(10)-dien-17α-propiolic acids which are subsequently converted to the hereinafter listed 13-alkyl-17-hydroxy-3-oxogon-4-en-17α-propiolic acids:

| Starting Material | Products |
| --- | --- |
| 17α-ethynyl-3-methyoxy-13-methylgona-2,5(10)-dien-17β-ol. | 17-hydroxy-13-methyl-3-oxogon-4-en-17α-propiolic acid. |
| 17α-ethynyl-3-methoxy-13-propylgona-2,5(10)-dien-17β-ol. | 17-hydroxy-3-oxo-13-propylgon-4-en-17α-propiolic acid. |
| 13-butyl-17β-ethynyl-3-methoxygona-2,5(10)-dien-17β-ol. | 13-butyl-17-hydroxy-3-oxogon-4-en-17α-propiolic acid. |

EXAMPLE VII

Repeating the procedure of Example II, the 13-alkyl-17-hydroxy-3-oxogon-4-en-17α-propiolic acids of Example VI are converted to their corresponding sodium and potassium salts which are then hydrogenated by the process of Example III to afford the following compounds:

17-hydroxy-13-methyl-3-oxo-5γ-gonane-17α-propionic acid, sodium salt;
17-hydroxy-13-methyl-3-oxo-5γ-gonane-17α-propionic acid, potassium salt;
17-hydroxy-3-oxo-13-propyl-5γ-gonane-17α-propionic acid, sodium salt;
17-hydroxy-3-oxo-13-propyl-5γ-gonane-17α-propionic acid, potassium salt;
13-butyl-17-hydroxy-3-oxo-5γ-gonane-17α-propionic acid, sodium salt; and
13-butyl-17-hydroxy-3-oxo-5γ-gonane-17α-propionic acid, potassium salt.

What is claimed is:
1. A compound selected from the group consisting of:

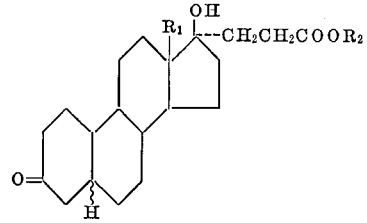

wherein $R_1$ is selected from the group consisting of lower polycarbonyl alkyl; and $R_2$ is selected from the group consisting of sodium and potassium and the symbol ($\ddagger$) designated the α or β configuration.

2. A compound as described in claim 1 which is: 13-ethyl-17-hydroxy-3-oxo-5γ-gonane-17α-propionic acid, sodium salt.
3. A compound as described in claim 1 which is: 13-ethyl-17-hydroxy-3-oxo-5γ-gonane-17α-propionic acid, potassium salt.
4. A compound as described in claim 1 which is: 17-hydroxy-3-oxo-13-propyl-5γ-gonane-17α - propionic acid, sodium salt.
5. A compound as described in claim 1 which is: 17-hydroxy-3-oxo-13-propyl-5γ-gonane-17α - propionic acid, potassium salt.
6. A compound as described in claim 1 which is: 13-butyl-17-hydroxy-3-oxo-5γ-gonane-17α-propionic acid, sodium salt.
7. A compound as described in claim 1 which is: 13-butyl-17-hydroxy-3-oxo-5γ-gonane-17α-propionic acid, potassium salt.

References Cited

UNITED STATES PATENTS 2,952,676   9/1960   Cella _____ 260—239.57

ELBERT L. ROBERTS, Primary Examiner

U.S. Cl. X.R.

260—999